United States Patent
Lundblade et al.

(10) Patent No.: US 8,020,001 B2
(45) Date of Patent: Sep. 13, 2011

(54) TRUSTED CODE GROUPS

(75) Inventors: Laurence Lundblade, San Diego, CA (US); Brian Harold Kelley, San Diego, CA (US); Matthew Hohlfeld, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1060 days.

(21) Appl. No.: 11/361,230

(22) Filed: Feb. 23, 2006

(65) Prior Publication Data

US 2007/0198841 A1 Aug. 23, 2007

(51) Int. Cl.
*G06F 21/00* (2006.01)
(52) U.S. Cl. .................. 713/176; 726/1; 726/2; 726/17; 726/30; 717/163; 717/164
(58) Field of Classification Search .................... 713/176
See application file for complete search history.

(56) References Cited

U.S. PATENT DOCUMENTS

| | | | |
|---|---|---|---|
| 6,182,279 B1 | 1/2001 | Buxton | |
| 6,516,316 B1 * | 2/2003 | Ramasubramani et al. | .. 713/176 |
| 2004/0139342 A1 | 7/2004 | Aho et al. | |
| 2005/0251487 A1 | 11/2005 | Evans et al. | |
| 2005/0278535 A1 * | 12/2005 | Fortune et al. | ................ 713/176 |

FOREIGN PATENT DOCUMENTS

| | | |
|---|---|---|
| CN | 1545243 | 11/2004 |
| WO | WO2006011943 | 2/2006 |

OTHER PUBLICATIONS

International Search Report and Written Opinion—PCT/US07/062749, International Search Authority—European Patent Office—Aug. 27, 2007.

* cited by examiner

*Primary Examiner* — Brandon S Hoffman
*Assistant Examiner* — Thong Truong
(74) *Attorney, Agent, or Firm* — James T. Hagler

(57) ABSTRACT

Described are techniques and mechanisms for enforcing trust between an application and a library loaded by the application. Very generally stated, the application declares one or more trusted code groups ("TCGs") of which a library must be a member to be authorized for execution with the application. Libraries that are authorized to assert membership in one or more TCGs include a secure indicator of that membership. As the application executes and attempts to load a library, that libraries membership in a TCG authorized by the application is verified prior to loading the library.

35 Claims, 6 Drawing Sheets

TRUSTED CODE GROUPS

BACKGROUND OF THE INVENTION

1. Field of the Invention

The invention relates generally to the field of software security, and more particularly to software security verification and validation.

2. Description of the Related Art

Software applications today are typically composed of several different executable modules that work together to provide a common "application function." For instance, a developer of a new application may write source code that implements the "core business logic" of the application, while resorting to third party or other code libraries for more routine functionality, such as common dialog boxes or communication functions. At runtime, the application is launched and instructs the operating system to load an instance of the other libraries which are dynamically linked to the executing application code. Then the application and the libraries typically work together as a single unit in memory while the application is executing.

However, managing trust between the executing application code and the libraries is difficult. While an application is executing, any libraries that it loads are mapped into the application's memory space or process boundary and execute as if it was part of the application. Once loaded there are no boundaries between the application and the library, and the application is placing complete trust in the library when it calls into the library. The library could modify, delete, or redistribute any or all data the application has access to. As applications become more complex, and libraries are more commonly loaded on a computing device from various, possibly un-trusted locations, it is becoming more important to focus on the security and integrity (i.e., the "trustworthiness") of code libraries that may be called or loaded by an application.

An adequate mechanism to evaluate and/or ensure the trustworthiness of a code library has eluded those skilled in the art, until now.

SUMMARY OF THE INVENTION

The invention is directed to techniques and mechanisms for ensuring or enforcing trust between an application and a library. In one aspect, the invention envisions a method for ensuring trust between code modules. The method includes receiving an application that uses a class of functionality, the application including a list of Trusted Code Groups ("TCGs") trusted by the application to implement the class. The method also includes receiving a library that implements the class of functionality, the library being signed using a signing key, the signature associating the library with a TCG, the TCG being an endorsement of trustworthiness. When a call is initiated to cause the library to be loaded, the method includes, prior to loading the library, causing the signature on the library to be verified to determine if the library is a member of one of the listed TCGs.

In another aspect, the invention envisions a method and a computer-readable medium for verifying a trustworthiness of a library. The method includes receiving an instruction from an application to load the library, the application having an associated list of authorized TCG IDs, each TCG ID being associated with a TCG that represents a level of trust associated with a group of libraries. The method further includes examining the library to detect a digital signature that associates a TCG ID with the library, comparing the TCG ID of the library to the list of authorized TCG IDs associated with the application to determine if the library is authorized to execute with the application, and if the library is authorized, loading the library.

In yet another aspect, the invention envisions an apparatus for verifying a trustworthiness of a library. The apparatus includes a storage medium on which is stored an application and a library, a processor, and a memory coupled to the processor and the storage medium, and in which resides computer-executable components. The components are operative to cause the processor to receive an instruction from an application to load the library, the application having an associated list of authorized TCG IDs, each TCG ID being associated with a TCG that represents a level of trust associated with a group of libraries, to examine the library to detect a digital signature that associates a TCG ID with the library, to compare the TCG ID of the library to the list of authorized TCG IDs associated with the application to determine if the library is authorized to execute with the application, and if the library is authorized, to load the library.

BRIEF DESCRIPTION OF THE DRAWINGS

The features and advantages of the present invention will become more apparent from the detailed description set forth below when taken in conjunction with the drawings in which like reference characters identify correspondingly throughout.

DETAILED DESCRIPTION

What follows is a detailed description of various embodiments of the invention that enable an application developer to control the trustworthiness of libraries that the application may cause to be loaded at runtime. Briefly stated, the invention envisions allowing library developers to have their shared libraries evaluated for inclusion in one or more "trusted code groups." An application developer then includes a listing that identifies those trusted code groups that the application should trust at runtime. When an installed application is launched and attempts to load a library, a trust manager verifies that the library is within a trusted code group recognized by the application. If so, the trust manager allows the library to be loaded, and if not, the trust manager fails the load.

Figure 1:
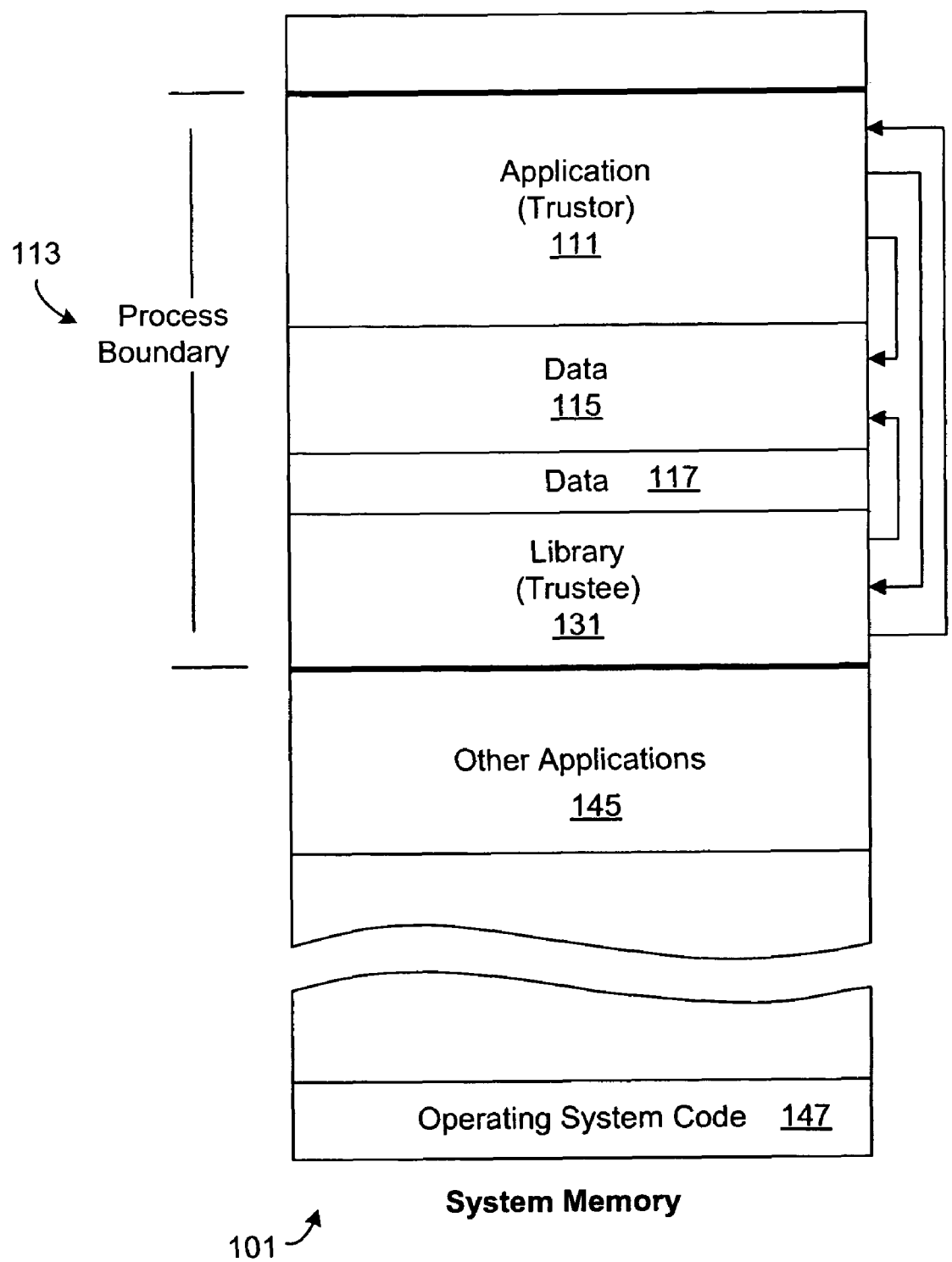
FIG. 1 shows a system memory in which are executing an application and an instance of a library, in accordance with one implementation of the invention.

To begin the discussion, FIG. 1 shows a system memory 101 in which are executing an application 111 and an instance of a library 131, in accordance with one implementation of the invention. Other code may also be executing in the system memory 101, such as other applications 145 and/or operating system code 147. Before proceeding, it is helpful to provide some definitions of terms that will be used throughout this document.

The term "trustor" means any executable code (e.g., an application) that loads a trustee. The trustor has a memory or process protection boundary around it and makes policy for what comes and goes across that boundary. A simple user application is only one example of a trustor. Other examples include, without limitation, scripts, web page content (e.g., "Flash" or "Shockwave" components), user interfaces (e.g., a user interface specification in a high level UI description language), and the like.

The term "trustee" means any executable code (e.g., a library) or configuration data that gets loaded by the trustor at runtime. The term "trustee" includes, without limitation, shared and public libraries, dynamically and statically linked libraries, "extensions", scripts, configurations, content, user interfaces, or any other resource (e.g., image or multimedia data) as those terms are used in the art.

The terms "application" and "trustor" may be used interchangeably throughout this document. Likewise, the terms "library" and "trustee" may be used interchangeably throughout this document. Accordingly, no specific meaning should be attached to the terms "application" or "library" different than the meanings just ascribed to those terms.

As shown in FIG. 1, when an application 111 is loaded in memory 101, a process is created in which the application executes, and that process has a process boundary 113. Code that is executing within the process boundary 113 generally has free access to any memory locations within that boundary, but does not have access, at least not directly, outside the process boundary 113. Although illustrated here as contiguous memory space, it will be appreciated that a process may have discontiguous memory locations as well.

In this example, the application 111 is executing within the process boundary 113 and has allocated for itself memory space for data 115. Although shown here as a single contiguous data space 115, it will be appreciated that the application 111 may have several different data locations for different types of data.

At any point during execution, the application 111 may cause to be loaded one or more libraries, such as library 131. In this example, the library 131 could be any supplemental code used by the application 111 but which is not integral to the application 111. In one example, the library 131 could be a third-party library that implements some core or special functionality.

The library 131 generally has no process or protection boundaries of its own, but rather executes within the application's process boundary 113. Accordingly, the library 131 has access to everything the application 111 does, such as the application's data 115 and even portions of the application executable code. Moreover, the library 131 may have its own data 117 to which the application 111 may have access. It is this free access to the application's code 111 and data 115 that creates the need for a strong trust relationship between the application 111 and the library 131.

As is described more fully in the remainder of this patent document, the application 111 declares certain information that defines a trust relationship to which the library 131 must belong. When loaded, the library 131 indicates those trust relationships to which is does belong. When the library 131 begins loading, if it does not belong to a trust relationship recognized by the application 111, the load is failed.

Figure 2:
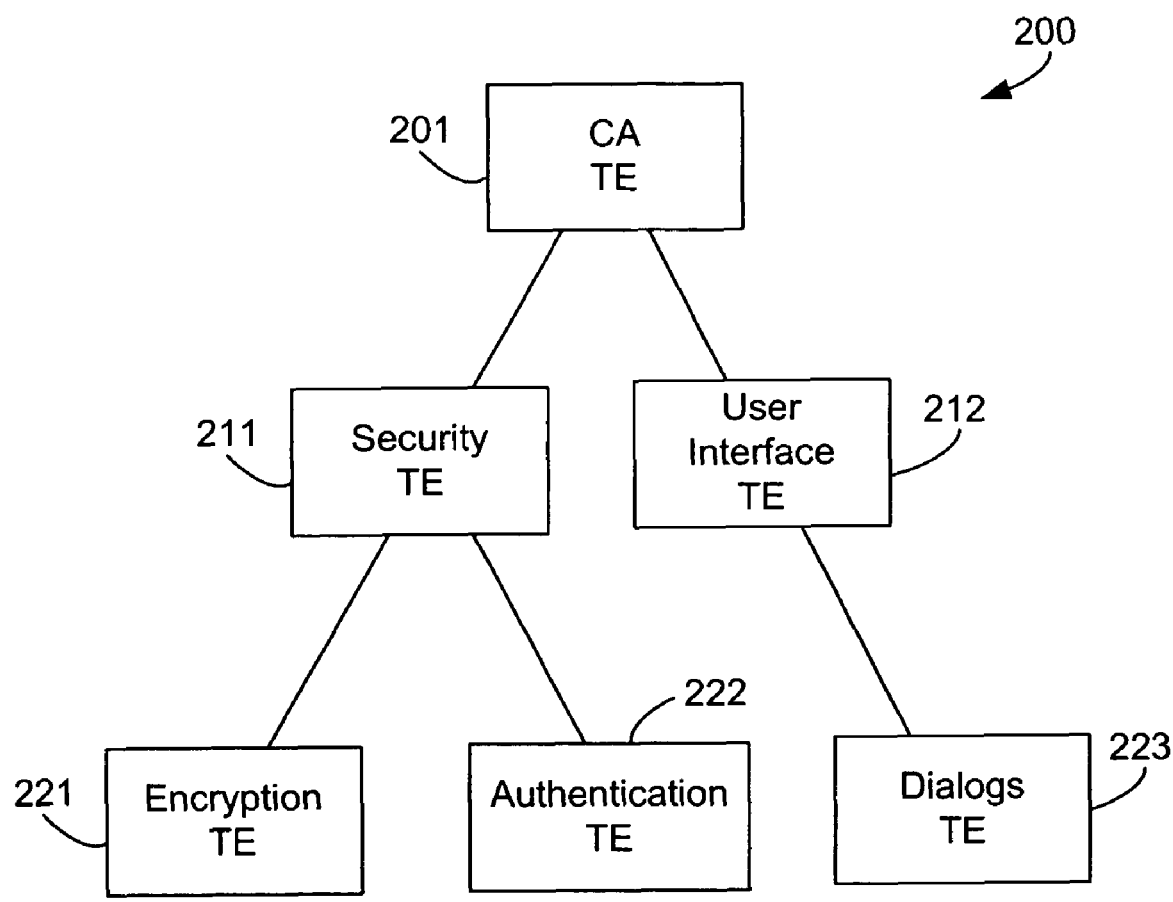
FIG. 2 is a conceptual illustration of a hierarchy of Trusted Entities ("TEs") that each have one or more associated Trusted Code Groups ("TCGs").

FIG. 2 is a conceptual illustration of a hierarchy 200 of Trusted Entities ("TEs") that each have one or more associated Trusted Code Groups ("TCGs"). In accordance with the invention, a Trusted Code Group ("TCG") is essentially a group of code modules that are equally trusted. A Trusted Entity (TE) is an organization, or possibly an individual, that approves or certifies code modules into one or more TCGs. It is envisioned that a particular TE will take ownership of a particular TCG and evaluate or test code modules proposed for membership in the TCG.

In one specific implementation, each TCG has an associated TCG Identifier (TCG ID). The TCG ID is a 32-bit integer that identifies the TCG and uniquely distinguishes each TCG from other TCGs. In this specific implementation, the full range of TCG IDs may extend from 0x00000000 to 0xFFFFFFFF. Referring to FIG. 2, a highest level TE (i.e., TE 201) has ownership of the entire range of TCG IDs. This highest level TE 201 may be an organization responsible for the operating system on mobile devices, or the like.

The highest level TE 201 delegates ranges within the entire TCG ID range to subordinate TEs that correspond to some area of expertise or particular domain of trust. In one example, a subordinate TE (security TE 211) may have the obligation to verify and endorse code libraries that are related to any type of security feature. Thus, a range of TCG IDs for security features is delegated to the security TE 211. The security TE 211 may further delegate a sub-range of its TCG IDs to a next level TE. For example, the security TE 211 may delegate a sub-range of TCG IDs to an encryption TE 221 or an authentication TE 222.

The highest level TE 201 may delegate a different range of TCG IDs for user interface components to a user interface TE 212 that is responsible for user interface libraries. The user interface TE 212 then further delegates a sub-range of its TCG IDs to a common dialogs TE 223 that is responsible for common dialogs. This hierarchical system allows for a flexible distribution of ranges of TCG IDs that can accommodate additional TCGs in the future. It will be appreciated that certain sub-ranges of the entire range could be excluded from use as a TCG ID for some reason, such as to be reserved for another use.

To illustrate this concept with a concrete example, assume that the highest level TE 201 delegated the range 0x000F0000 through 0x000FFFFF to the security TE 211, and the range 0x00100000 through 0x1A0000 to the user interface TE 212. The security TE 211 may in turn delegate the sub-range 0x000F000F through 0x000F00FF to the encryption TE 221, and delegate the sub-range 0x000F0100 through 0x000F0FFF to the authentication TE 222. The user interface TE 212 could delegate the sub-range 0x0010F000 through 0x0010FFFF to the common dialogs TE 223. Of course, these specific ranges and sub-ranges are merely examples to illustrate the concept and are not necessary to the invention in any way.

Figure 3:
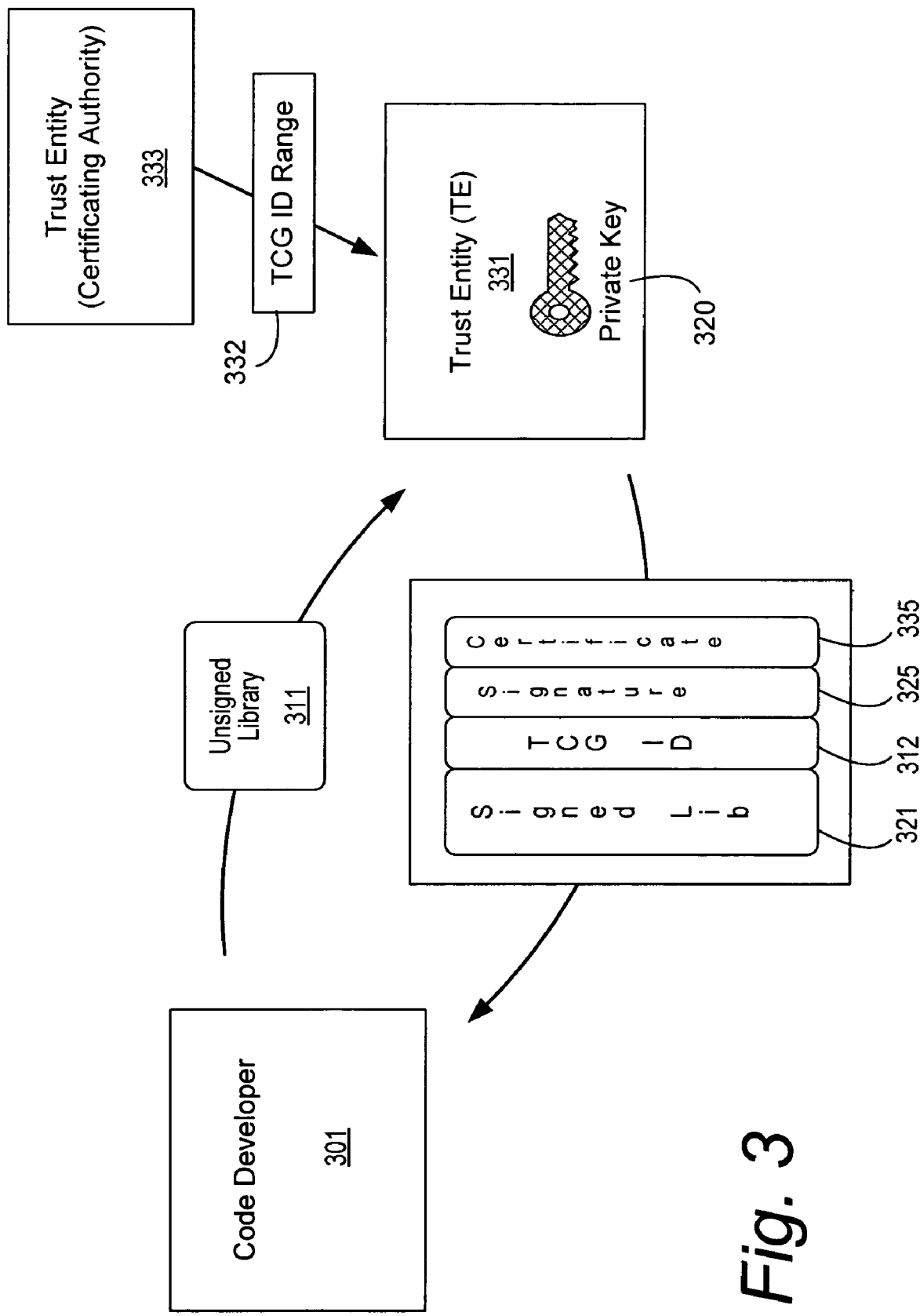
FIG. 3 illustrates a sample development environment in which a code developer interacts with a TE to get a library approved for a particular TCG under control of the TE.

FIG. 3 illustrates a sample development environment in which a code developer 301 interacts with a TE 331 to get a shared library 311 signed into a particular TCG under control of the TE 331. In this example, the code developer 301 may have developed a library 311 that can be used in a digital rights management ("DRM") application to decode secured media content. The TE 331 has been delegated a range of TCG IDs 332 with the authority to approve libraries into a particular TCG for DRM libraries. The TE 331 receives the authority to endorse libraries from a root TE authority or a "CA" 333 in this example.

The developer 301 presents the unsigned library 311 to the TE 331 for approval, which may include any manner of investigation such as bug checking, virus checking, performance evaluations, or perhaps simply the verification of the identity of the developer 301 to ensure that the developer 301 is trustworthy. If the unsigned library 311 and/or the developer 301 satisfy the TE's criteria, then the TE 331 "signs" the unsigned library 311. Signing the unsigned library 311 may include generating a hash value of the unsigned library 311 and encoding that hash value using a private key 320. That encoded hash value is referred to as a digital signature 325 of the unsigned library 311.

In one implementation, the TCG ID 312 of the group into which the library is being signed is added to the unsigned library 311 when the digital signature 325 is generated. This allows a direct identification of the TCG from information added to the library during the signing process. Alternatively, the TCG ID may be associated with the signing authority (e.g., the TE 331 or the CA 333) and embedded in its root certificate, allowing the TCG to be determined indirectly from the certificate chain when the digital signature 325 is verified at runtime. A common digital certificate standard that is applicable to implementations of the invention is the ITU-T X.509 standard.

It will be appreciated that the digital signature 325 effectively binds the signed library 321 to the TCG either explicitly, in the case where the TCG ID 312 is included with the package, or implicitly, in the case where the certificate 335 is associated with the TCG through the certificate chain.

The TE 331 then returns the signed library 321, the digital signature 325, and possibly the TCG ID 312 of the group into which the library has been signed. The TE 331 also returns the TE's certificate 335, which includes the TE's public key for use in verifying the authenticity of the digital signature 325.

The TE certificate 335 could in fact be a certificate chain that includes intermediate certificates leading to a trusted root certificate, such as a certificate for the CA 333. The developer 301 is now ready to distribute the signed library 321.

It should be noted that although described here as a single entity that performs both the library approval and the certificate issuance, those two tasks could be performed by separate entities. For example, in some cases the TE 331 may appeal to the CA 335 to issue the certificate 335, or perhaps to a completely separate entity.

Figure 4:
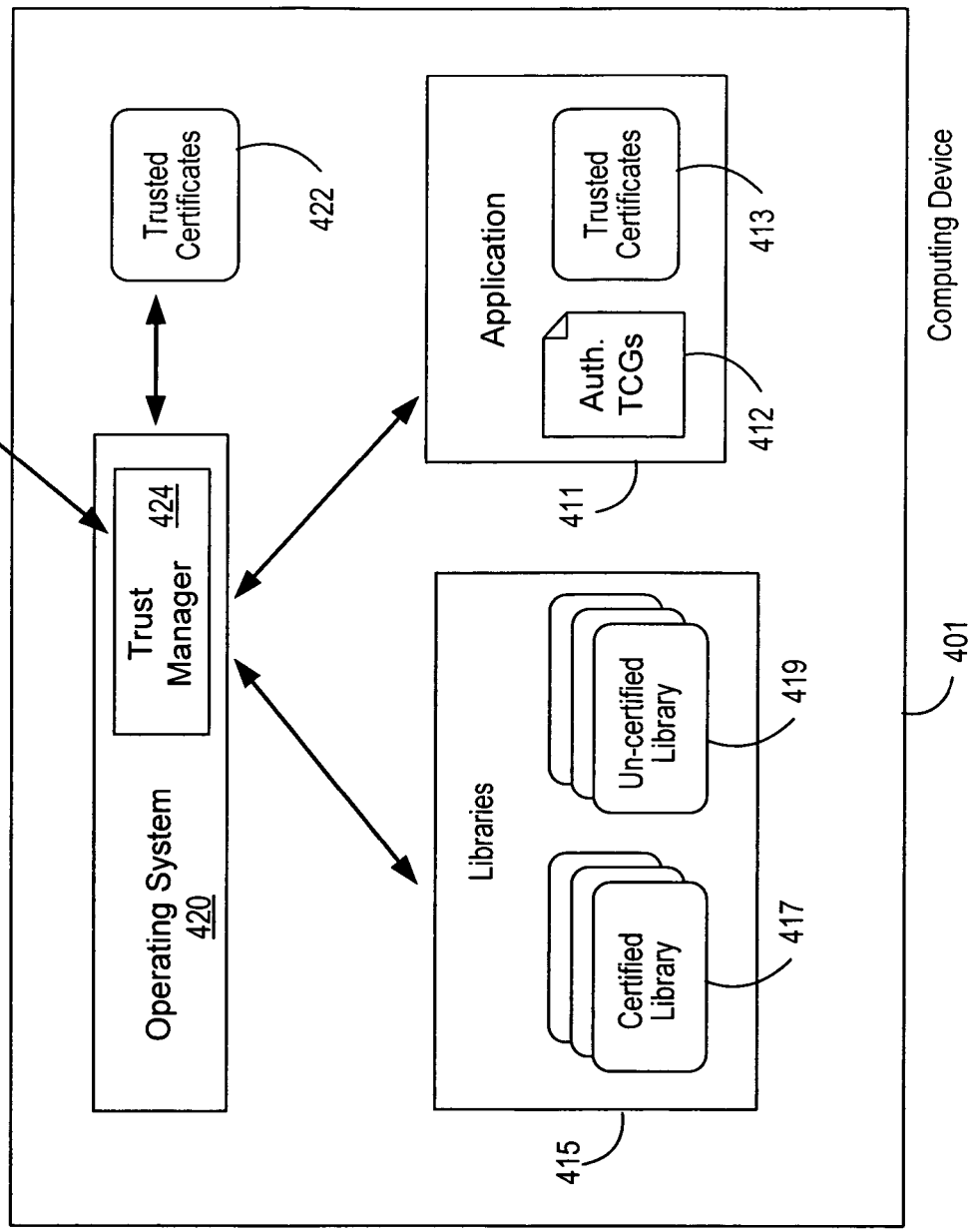
FIG. 4 illustrates a computing device, such as a handheld computing device, on which executes an application that uses a library, in accordance with an implementation of the invention.
Figure 6:
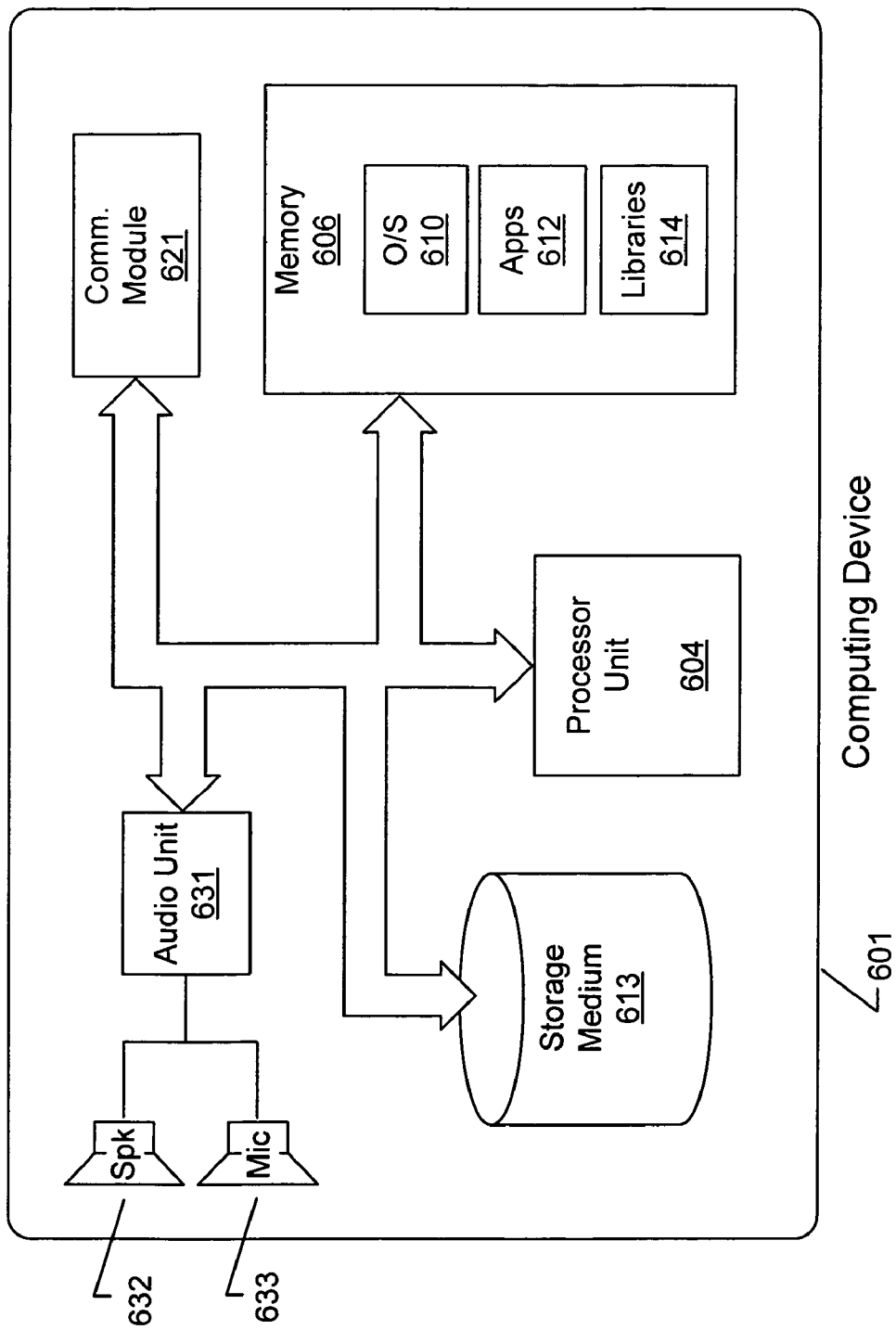
FIG. 6 is a functional block diagram generally illustrating the core components of a sample computing device in which implementations of the invention are particularly applicable.

FIG. 4 illustrates a computing device 401, a handheld computing device in this example, on which executes an application 411. One example computing device that may be used in implementations of the invention is illustrated in FIG. 6 and described below. The computing device 401 includes an operating system 420 and one or more installed applications (e.g., application 411). There are also one or more code libraries 415, which may be "certified" as described above (e.g., certified library 417) or un-certified (e.g., library 419). In this example, the certified library 417 has been approved for inclusion in a TCG, and has been signed by an appropriate TE as described above.

The application 411 has meta-data that includes an authorized TCG list 412, which may be a list of the authorized TCG IDs that the application 411 declares it recognizes. This means that any libraries 415 loaded with the application 411 must be in one of the TCGs in the authorized TCG list 412. It will be appreciated that the authorized TCG list 412 may include a range or ranges of trusted TCG IDs, rather than simply a list of individual TCG IDs.

The application 411 may also include a list of trusted certificates 413, which includes root certificates for any TEs that the application 411 trusts.

The root certificates are used to determine whether a certified library has been altered since it was signed by using the TE's public key (embedded in the root certificate) to validate the digital signature of the certified library 517. The trusted certificates 413 may be pre-installed on the computing device 401, or may be installed with the application 411 or at any other time. The operating system 420 may also maintain a store of trusted certificates 422 in addition to or in lieu of the trusted certificates 413 maintained by the application 411.

When the application 411 is executing, it may try to launch (e.g., perhaps using a "CreateInstance" call, or the like) the certified library 417. The application 411 declares that any library it calls must be a member of one of the trusted TCGs in the authorized TCG list 412. This could either be done at initialization as part of the application's startup procedure, or the application 411 could pass in the authorized TCG list 412 (or the relevant part of it) with the call (e.g., CreateInstance) to load the library.

In response to the request by the application 411, the operating system 420 locates the certified library 417 and determines if it is approved for execution with the application 411. The approval determination may be performed by a trust manager 424 module of the operating system 420 that extracts a digital signature from the certified library 417 and determines if a corresponding root certificate exists in the application trusted certificates 413, or perhaps in the global trusted certificates 422. If so, the trust manager 424 verifies the authenticity of the library's digital signature to ensure that the library has not been altered since it was signed. This verification may include checking with a remote Trust Entity or Certificating Authority 460 to ensure that the appropriate root certificate is not revoked.

If all that validates, the operating system 420 loads the certified library 417 (or a portion of it) and links it to the application 411 in the application's memory space. If any test along the way fails, then the operating system 420 doesn't load the certified library 417 and returns an error.

In some cases, the application 411 may request a particular class of functionality without necessarily specifying which particular library to invoke. There may be multiple libraries that provide the requested functionality, some certified libraries 417 and some un-certified libraries 419. In those cases, the operating system 420 may only make available to the application 411 those libraries that meet the application's TCG requirements (i.e., a certified library 417). For example, the application 411 may render audio content, such as "MP3" content, that is subject to DRM control. In that case, the application 411 will likely require that any MP3 decoders (libraries) be trusted not to pirate the content. This trust may come in the form of membership in a particular DRM TCG. Thus, when the application 411 requests an MP3 decoder library, the operating system 420 only makes MP3 decoder libraries available that are members of the particular DRM TCG.

Figure 5:
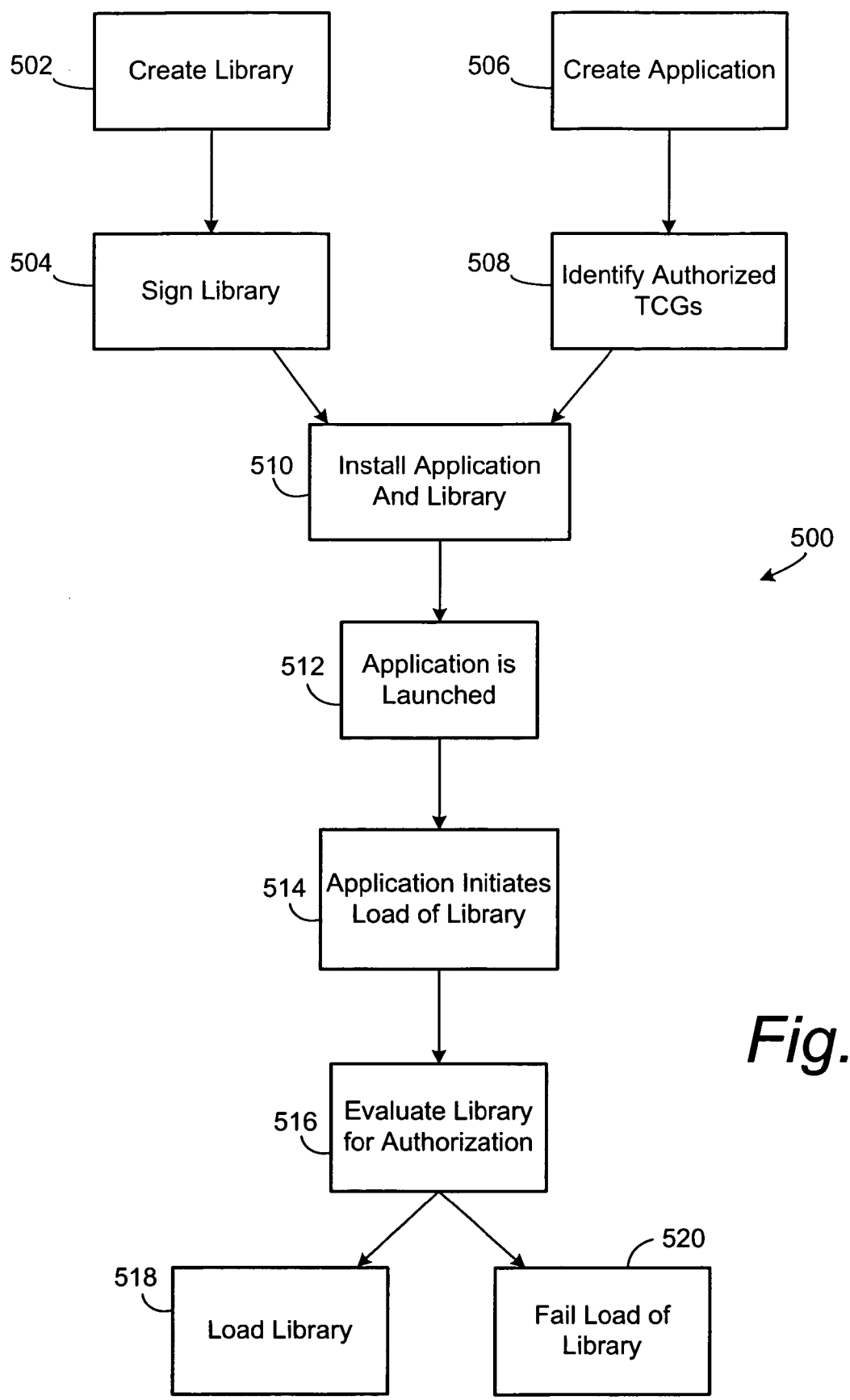
FIG. 5 is an operational flow diagram generally illustrating a method for ensuring trust between an application and a library loaded by that application.

FIG. 5 is an operational flow diagram generally illustrating a method 500 for ensuring trust between an application and a library loaded by that application. The method 500 generally describes steps performed by various mechanisms in a system for establishing and verifying trust between the application the library.

At block 502, a library is created by a code developer. The library may be any module or component of code that is intended or able to execute in a supporting role by sharing a process with another module of executing code, such as an application.

At block 504, the library is signed to represent that the library is authorized for inclusion in a TCG. Inclusion in the TCG implies that the library is endorsed by some trusted entity (e.g., a TE) and has been verified to be compliant with any requirements or criteria for inclusion in the TCG. In one implementation, a TCG ID that identifies the particular group in which the library has been signed is explicitly added to the library when it is signed. In an alternative embodiment, a TCG certificate is included with the signed library that represents the particular TCG in which the library has been signed. The TCG certificate is either issued by a TE, or derives its authority from a TE responsible for the TCG. In this way, the signature binds the library to the TCG, either implicitly or explicitly.

At block 506, an application is created and configured to use a library such as the library created at block 502. The application may be any executable code that performs some primary functionality, and relies on another module of code (i.e., a library) to support that functionality or to provide some supplemental functionality.

At block 508, a list of authorized TCGs is added to the application, such as in meta-information for the application. The list of authorized TCGs identifies those TCGs to which any library that is loaded to support the application must belong in order to execute in the process or memory boundary of the application. Alternatively or in addition, the application may include trusted root certificates that represent TEs that the application developer trusts to sign libraries into a TCG.

At block 510, the application from block 508 and the library from block 504 are installed on a computing device, such as a handheld computing device or intelligent cellular phone. It will be appreciated that the application and the library need not be installed at the same time, and likely will not be, but that both components ultimately get installed on the same device.

At block 512, the application is started and begins execution. When the application is launched, a code signature for the application optionally may be verified to ensure that the code was actually provided by the code developer, but that verification is significantly different in character and purpose from the TCG verification described in the bulk of this document.

At block 514, the application issues a CreateInstance call to load a class that is implemented by the library. It will be appreciated that in some cases, an application may be written to make calls to a class of library rather than to a particular library. Multiple libraries could be installed to implement that class of library and as such, the application does not have specific control over which implementing class gets instantiated. However, the call by the application to create an instance of that class of library initiates, in this example, the loading of the library from block 510.

At block 516, before the library is loaded, the signature on the library is checked to be sure it is valid and chains up to root certificates that are identified as trusted by the application. In one implementation, a valid signature indicates that the library has not been altered since it was signed. Accordingly, a TCG ID included with or embedded in the library directly identifies to which TCG the library belongs. Alternatively, the TCG membership may be determined from the certificate chain used to sign the library. For example, trusted root certificates associated with the application may contain confirming (e.g., root) certificates for trusted entities with signing authority for a particular TCG. The TCG certificate associated with the library is evaluated against the local trusted root certificates. It should be noted that an application could identify multiple TCG IDs that are authorized to execute with the application. Those multiple TCG IDs could be identified either as simply a list of TCG IDs, a range of TCG IDs, or perhaps a Boolean expression that defines which one or more TCGs a library must belong to in order to execute with the application. These and other alternatives will be apparent to those skilled in the art.

If the signature on the library confirms its trustworthiness, then at block 518 the library is loaded. If however the signature on the library fails the confirmation in any way, then at block 520 it is not loaded. If multiple libraries are loaded on the computing device, an alternative library may be selected and evaluated in the same manner as the initial library. Alternatively, a security prompt may be issued to allow a trust decision to be made by a user or another security confirming authority. Yet another alternative is to simply fail the load of the library and issue an error code to that effect.

FIG. 6 is a functional block diagram generally illustrating the core components of a sample computing device 601 in which implementations of the invention are particularly applicable. The computing device 601 could be any mobile computing device, such as a cellular telephone, a personal digital assistant, a handheld "palmtop" device, a laptop computer, a portable music player, a global positioning satellite (GPS) device, or the like. Similarly, the computing device 601 could be any fixed computing device, such as a desk-top computer or server.

In this example, the computing device 601 includes a processor unit 604, a memory 606, a storage medium 613, and an audio unit 631. The processor unit 604 advantageously includes a microprocessor or a special-purpose processor such as a digital signal processor (DSP), but may in the alternative be any conventional form of processor, controller, microcontroller, or state machine.

The processor unit 604 is coupled to the memory 606, which is advantageously implemented as RAM memory holding software instructions that are executed by the processor unit 604. In this embodiment, the software instructions stored in the memory 606 include an operating system 610, one or more applications 612, and one or more code libraries 614. The memory 606 may be on-board RAM, or the processor unit 604 and the memory 606 could collectively reside in an ASIC. In an alternate embodiment, the memory 606 could be composed of firmware or flash memory.

The processor unit 604 is coupled to the storage medium 613, which may be implemented as any nonvolatile memory, such as ROM memory, flash memory, or a magnetic disk drive, just to name a few. The storage medium 613 could also be implemented as any combination of those or other technologies, such as a magnetic disk drive with cache (RAM) memory, or the like. In this particular embodiment, the storage medium 613 is used to store data during periods when the computing device 601 is powered off or without power.

The computing device 601 also includes a communications module 621 that enables bidirectional communication between the computing device 601 and one or more other computing devices. The communications module 621 may include components to enable RF or other wireless communications, such as a cellular telephone network, Bluetooth connection, wireless local area network, or perhaps a wireless wide area network. Alternatively, the communications module 621 may include components to enable land-line or hard-wired network communications, such as an Ethernet connection, RJ-11 connection, universal serial bus connection, IEEE 6394 (Firewire) connection, or the like. These are intended as non-exhaustive lists and many other alternatives are possible.

The audio unit 631 is a component of the computing device 601 that is configured to convert signals between analog and digital format. The audio unit 631 is used by the computing device 601 to output sound using a speaker 632 and to receive input signals from a microphone 633.

FIG. 6 illustrates only certain components that are generally found in most conventional computing devices. Very many other components are also routinely found in particular implementations, and in certain rare cases, some components shown in FIG. 6 may be omitted. However, the computing device 601 shown in FIG. 6 is typical of the devices commonly found today.

While the present invention has been described with reference to particular embodiments and implementations, it should be understood that these are illustrative only, and that the scope of the invention is not limited to these embodiments. Many variations, modifications, additions and improvements to the embodiments described above are possible. It is contemplated that these variations, modifications, additions and improvements fall within the scope of the invention as detailed within the following claims.

We claim:

1. A method executed by a computer for ensuring trust between code modules, the method comprising:
    receiving code identifying a hierarchy of Trusted Entities ("TEs"), the hierarchy consisting of a root TE and at least one subordinate TE, each subordinate TE having one or more associated Trusted Code Groups ("TCGs"), each TCG having a unique 32-bit TCG ID;
    receiving an application that uses a class of functionality, the application including a first list of TGCs trusted by the application to implement the class;
    receiving a library that implements the class of functionality, the library being signed using a signing key, the signature including a list of TCG IDs identifying a second list of TCGs, each TCG in the second list of TCGs being a module that the library has been approved to access;
    executing code in the application which requests creation of an instance of a class implemented in the library;
    loading the library into application memory; and
    prior to loading the library, causing the signature on the library to be verified to determine if the TGC IDs in the signature of the library are listed in the first list of TGCs,
    wherein each TGC ID is allocated a bit range uniquely identifying the subordinate TE to which it belongs.

2. The method recited in claim 1, wherein the signature associates the library with the TCG by binding the library to the TCG ID that identifies the TCG.

3. The method recited in claim 1, wherein public key cryptography is used to sign and verify the library.

4. The method recited in claim 3, wherein the signing and verification are done using certificate hierarchies.

5. The method recited in claim 4, wherein causing the signature to be verified further comprises determining if the TCG certificate has expired.

6. The method recited in claim 4, wherein causing the signature to be verified further comprises determining if the TCG certificate has been revoked.

7. The method recited in claim 1, wherein the signature associates the library with the TCG through a certificate chain that associates the signing key with the root Trusted Entity ("TE") that is responsible for authorizing libraries to be signed into the TCG.

8. The method recited in claim 1, wherein causing the signature on the library to be verified comprises verifying the signature using a root certificate associated with the subordinate TE, the root certificate being used to verify the authenticity of the signature and that the subordinate TE is authorized to sign the library into the TCG.

9. The method recited in claim 1, wherein the application comprises one or more code modules selected from a group comprising a user application, a script, web page content, markup content, and a user interface.

10. The method recited in claim 1, wherein the library comprises one or more code modules selected from a group comprising a shared library, a public library, a dynamically linked library, a statically linked library, an extension, a script, a configuration, content, a user interface, and a resource.

11. A method executed by a computer for verifying a trustworthiness of a library, comprising:
    receiving code identifying a hierarchy of Trusted Entities ("TEs"), the hierarchy consisting of a root TE and at least one subordinate TE, each subordinate TE having one or more associated Trusted Code Groups ("TCGs"), each TCG having a unique 32-bit TCG ID;
    receiving an instruction from an application to load the library, the application having an associated list of authorized TGCs each TCG representing a level of trust associated with a group of libraries;
    examining the library to detect a digital signature that associates the library with a TCG;
    comparing the TCG of the library to the list of authorized TCGs associated with the application to determine if the library is authorized to execute with the application; and
    if the library is authorized, loading the library,
    wherein each TGC ID is allocated a bit range uniquely identifying the subordinate TE to which it belongs.

12. The method recited in claim 11, wherein the digital signature associates the library with the TCG through a certificate chain that associates a signing key used to create the digital signature with a root certificate for the subordinate Trusted Entity ("TE") that is responsible for authorizing libraries to be signed into the TCG.

13. The method recited in claim 11, wherein the digital signature associates the library with the TCG by binding the library to a TCG ID that identifies a particular TCG.

14. The method recited in claim 13, wherein the TCG ID comprises an integer value in a range of integer values, at least one of the integer values being used to identify a group of libraries that have been evaluated for authorization to use the at least one integer values.

15. The method recited in claim 11, further comprising validating the digital signature to ensure that the TCG association with the library is authentic.

16. The method recited in claim 15, wherein validating the digital signature comprises using a root certificate associated with a trusted entity to ensure that the digital signature is authentic.

17. The method recited in claim 15, wherein validating the digital signature comprises verifying that a trusted entity is authorized to sign the library into the TCG.

18. The method recited in claim 11, further comprising if the library is not authorized, not loading the library.

19. The method recited in claim 11, wherein the application comprises one or more code modules selected from a group comprising a user application, a script, web page content, markup content, and a user interface.

20. The method recited in claim 11, wherein the library comprises one or more code modules selected from a group comprising a shared library, a public library, a dynamically linked library, a statically linked library, an extension, a script, a configuration, content, a user interface, and a resource.

21. The method recited in claim 11, wherein the instruction from the application comprises a request for a particular class of functionality, and further wherein the library comprises one of a group of libraries that provide the particular class of functionality, the method further comprising the step of selecting the library from the group of libraries based on the library being associated with an authorized TCG.

22. A non-transitory storage medium having computer-executable instructions for verifying a trustworthiness of a library, comprising:
   receiving code identifying a hierarchy of Trusted Entities ("TEs"), the hierarchy consisting of a root TE and at least one subordinate TE, each subordinate TE having one or more associated Trusted Code Groups ("TCGs"), each TCG having a unique 32-bit TCG ID;
   receiving an instruction from an application to load the library, the application having an associated list of authorized TGCs, each TCG representing a level of trust associated with a group of libraries;
   examining the library to detect a digital signature that associates the library with a TCG;
   comparing the TCG of the library to the list of authorized TCGs associated with the application to determine if the library is authorized to execute with the application; and
   if the library is authorized, loading the library,
   wherein each TGC ID is allocated a bit range uniquely identifying the subordinate TE to which it belongs.

23. The storage medium recited in claim 22, wherein the digital signature associates the library with the TCG through a certificate chain that associates a signing key used to create the digital signature with a root certificate for the subordinate Trusted Entity ("TE") that is responsible for authorizing libraries to be signed into the TCG.

24. The storage medium recited in claim 22, wherein the digital signature associates the library with the TCG by binding the library to a TCG ID that identifies a particular TCG.

25. The storage medium recited in claim 24, wherein the TCG ID comprises an integer value in a range of integer values, at least one of the integer values being used to identify a group of libraries that have been evaluated for authorization to use the at least one integer values.

26. The storage medium recited in claim 24, further comprising validating the digital signature to ensure that the TCG ID association with the library is authentic.

27. The storage medium recited in claim 26, wherein validating the digital signature comprises using a root certificate associated with a trusted entity to ensure that the digital signature is authentic.

28. The storage medium recited in claim 26, wherein validating the digital signature comprises verifying that a trusted entity is authorized to sign the library into the TCG.

29. The storage medium recited in claim 22, further comprising if the library is not authorized, not loading the library.

30. The storage medium recited in claim 22, wherein the application comprises one or more code modules selected from a group comprising a user application, a script, web page content, markup content, and a user interface.

31. The storage medium recited in claim 22, wherein the library comprises one or more code modules selected from a group comprising a shared library, a public library, a dynamically linked library, a statically linked library, an extension, a script, a configuration, content, a user interface, and a resource.

32. The storage medium recited in claim 22, wherein the instruction from the application comprises a request for a particular class of functionality, and further wherein the library comprises one of a group of libraries that provide the particular class of functionality, the compwuter-executable instructions further comprising selecting the library from the group of libraries based on the library being associated with an authorized TCG.

33. An apparatus for verifying a trustworthiness of a library, comprising:
   means for receiving code identifying a hierarchy of Trusted Entities ("TEs"), the hierarchy consisting of a root TE and at least one subordinate TE, each subordinate TE having one or more associated Trusted Code Groups ("TCGs"), each TCG having a unique 32-bit TCG ID;
   means for receiving an instruction from an application to load the library, the application having an associated list of authorized TCGs, each TCG representing a level of trust associated with a group of libraries;
   means for examining the library to detect a digital signature that associates the library with a TCG;
   means for comparing the TCG of the library to the list of authorized TCGs associated with the application to determine if the library is authorized to execute with the application; and
   if the library is authorized, means for loading the library,
   wherein each TGC ID is allocated a bit range uniquely identifying the subordinate TE to which it belongs.

34. The apparatus recited in claim 33, further comprising if the library is not authorized, not loading the library.

35. An apparatus for verifying a trustworthiness of a library, comprising:
   a storage medium on which is stored an application and a library;
   a processor; and
   a memory coupled to the processor and the storage medium, and in which resides computer-executable components that are operative to cause the processor to:
      receive code identifying a hierarchy of Trusted Entities ("TEs"), the hierarchy consisting of a root TE and at least one subordinate TE, each subordinate TE having one or more associated Trusted Code Groups ("TCGs"), each TCG having a unique 32-bit TCG ID;
      receive an instruction from an application to load the library, the application having an associated list of authorized TCGs, each TCG representing a level of trust associated with a group of libraries;
      examine the library to detect a digital signature that associates the library with a TCG;
      compare the TCG of the library to the list of authorized TCGs associated with the application to determine if the library is authorized to execute with the application; and
      if the library is authorized, to load the library,
      wherein each TGC ID is allocated a bit range uniquely identifying the subordinate TE to which it belongs.

* * * * *